United States Patent [19]

Matsui et al.

[11] Patent Number: 4,790,023

[45] Date of Patent: Dec. 6, 1988

[54] METHOD FOR MEASURING DIMENSIONS OF FINE PATTERN

[75] Inventors: Shougo Matsui, Sagamihara; Kenichi Kobayashi, Tokyo, both of Japan

[73] Assignee: Fujitsu Limited, Kanagawa, Japan

[21] Appl. No.: 23,493

[22] Filed: Mar. 9, 1987

[30] Foreign Application Priority Data

Mar. 10, 1986 [JP] Japan .................................. 61-51959

[51] Int. Cl.$^4$ ............................................... G06K 9/46
[52] U.S. Cl. ............................................ 382/8; 382/25
[58] Field of Search ...................... 382/25, 8; 358/101, 358/106, 107

[56] References Cited

U.S. PATENT DOCUMENTS

| | | | |
|---|---|---|---|
| 4,017,721 | 4/1977 | Michaud | 358/217 |
| 4,360,274 | 11/1982 | Norton-Wayne | 356/394 |
| 4,596,037 | 6/1986 | Bouchard et al. | 382/8 |
| 4,627,096 | 12/1986 | Grattoni et al. | 382/8 |
| 4,644,583 | 2/1987 | Watanabe et al. | 382/25 |
| 4,658,428 | 4/1987 | Bedros et al. | 382/25 |
| 4,677,473 | 6/1987 | Okamoto et al. | 382/8 |

FOREIGN PATENT DOCUMENTS

0160160 11/1985 European Pat. Off. .
2542904 3/1977 Fed. Rep. of Germany .
2075650 10/1971 France .

*Primary Examiner*—Leo H. Boudreau
*Attorney, Agent, or Firm*—Armstrong, Nikaido, Marmelstein & Kubovcik

[57] ABSTRACT

A method for measuring the dimensions of a fine pattern, comprises first measuring a surface area and determining a profile of a displayed pattern image, second, calculating the center of gravity of the pattern image, third, calculating an equivalent diameter of a circular pattern having the same surface area as the pattern image, fourth, calculating a mean value of pattern lengths of lines which all pass through the center of gravity of the pattern image and which intersect the pattern image at two intersecting points; and fifth, comparing the mean value with the equivalent diameter of the circular pattern image. The pattern lengths are defined as distances between the two intersecting points.

4 Claims, 9 Drawing Sheets

METHOD FOR MEASURING DIMENSIONS OF FINE PATTERN

BACKGROUND OF THE INVENTION

1. Field of the Invention

The present invention relates to a method for measuring dimensions of a fine pattern of, for example, integrated circuits (IC's) or semiconductors, etc. More precisely, the present invention relates to a method for measuring the dimensions of a fine pattern or patterns displayed on a display unit, such as a monitor TV by an optical image forming system.

2. Description of the Related Arts

In the manufacture of IC's or LSI's etc., it is very important to control the dimensions of fine patterns, for example, contact holes or through holes, etc., formed on a wafer of an IC or LSI, etc., in order to ensure that they conform to design dimensions, and thus produce high quality products.

The fine patterns, such as contact holes, are usually reproduced on an enlarged scale on a screen of a monitor TV by an optical image forming system. Namely, enlarged dimensions of the fine patterns are optically displayed on the TV screen.

In view of the technical difficulties in a process of manufacturing fine circular patterns (e.g. contact holes) using a so-called CAD (computer-aided design) system, the fine patterns are usually designed to be rectangular- or square-shaped, as is well known.

In practice, however, circular patterns are formed on the wafer, etc., in place of the intended angular patterns, mainly because of a limited resolving power of the optical system used, or a limited etching precision or development, during the wafer manufacturing process. Namely, it is impossible or next to impossible to exactly reproduce an angular fine pattern as designed.

It should, however, be noted that such an inevitable phenomenon, i.e., formation of the circular patterns contrary to the design, does not in itself cause serious impairment of the quality of the products, since the shape per se of the contact holes is not important, to the establishing of a reliable electrical connection through the contact holes.

When such circular shape fine patterns are displayed on the monitor screen by the optical image forming system, slightly collapsed or deformed circular images appear on the monitor screen, depending on a deviation of the optical axis of the optical system, or a deviation of a light beam emission from a light source or the like, causing the peripheral edges of the patterns to be blurred or uneven in particular, thus resulting in a formation of substantially elliptically shaped pattern images on the monitor screen. Namely, the circular patterns on the wafer are reproduced as elliptical patterns on the screen. This often occurs in practice.

The deviation or deformation of the pattern images on the monitor screen, which is mainly caused by a failure or inaccuracy of the positioning or adjustment of the optical image forming system, as mentioned above, results in incorrect dimensional measurement of the patterns.

SUMMARY OF THE INVENTION

The primary object of the present invention is, therefore, to provide a precise and reliable measuring method which is free from the aforementioned drawbacks of the prior art.

In order to achieve the object mentioned above, according to one aspect of the present invention, there is provided a method for measuring a fine pattern, comprising detecting a surface area and a profile of a displayed pattern image, detecting a center of gravity of the displayed pattern image, detecting an equivalent diameter of a circular pattern having the same surface area as the displayed pattern image, detecting a mean value of pattern lengths of lines which pass through the center of gravity of the displayed pattern image and which intersect the displayed pattern image at two intersecting points, and comparing the obtained mean value with the equivalent diameter of the displayed pattern image. The pattern lengths are defined as distances between the two intersecting points.

BRIEF DESCRIPTION OF THE DRAWINGS

The invention will be described below in detail with reference to the accompanying drawings, in which:

FIGS. 6(1), 6(2), 6(3) and 6(4) show four different lines passing the center of gravity of the pattern image for explaining the detection of pattern lengths;

FIGS. 8A, 8B, 8C and 8D, is a detailed flow chart of the detection of pattern lengths shown in FIG. 7.

DESCRIPTION OF THE PREFERRED EMBODIMENTS

Figure 2:
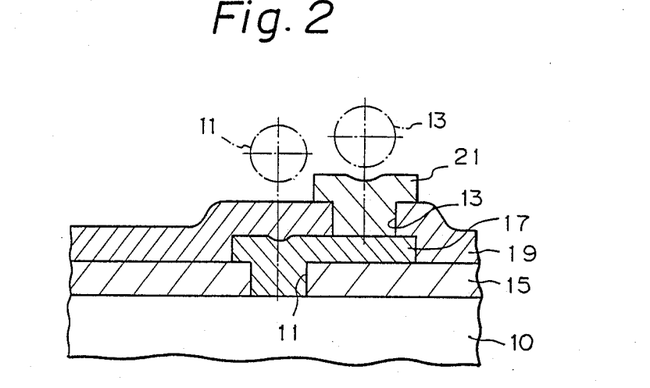
FIG. 2 is a sectional view of a wafer having contact holes as fine patterns.

FIG. 2 shows an IC wafer 10 having contact holes 11 and 13, to be measured. The wafer 10 has an insulation layer 15 thereon, and having a contact hole or contact holes 11 in which an electrode 17 is formed. On the insulation layer 15 and the electrode 17 is formed another insulation layer 19 having a contact hole or contact holes 13 in which an electrode 21 is formed, to establish an electrical connection between the two electrodes 17 and 21 through the contact holes 11 and 13. The contact holes 11 and 13 are fine circular patterns, as mentioned above. When the dimensions, particularly the diameters of the circular patterns 11 and 13, are displayed on a screen 51 of a monitor TV 50 (FIG. 2), the displayed pattern 100 (FIG. 2) is not a true circle but is slightly deformed, i.e., an elliptical pattern, as mentioned before.

Figure 1:
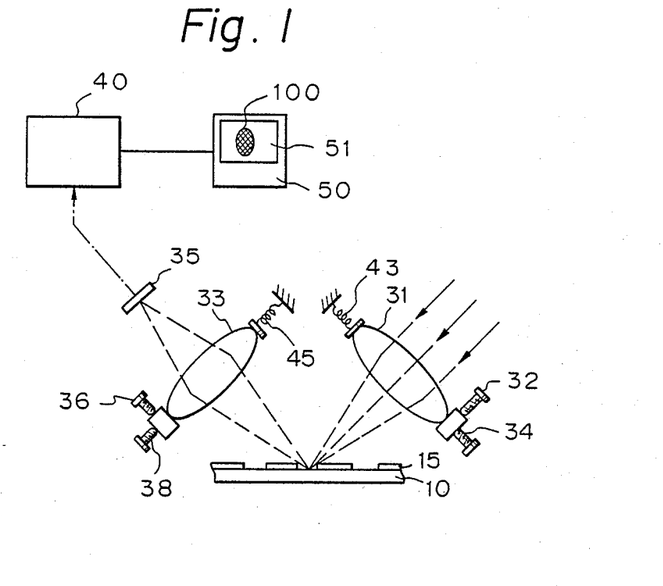
FIG. 1 is a schematic view of an optical image forming system used in the present invention.

FIG. 1 shows an optical image forming system in which a light beam from a light source (not shown) is focused on the wafer 10 having the insulation layer 15 having the contact hole 11 to be measured, by means of a focusing lens 31. When the contact hole(s) 11 are measured, measuring is effected before the insulation layer 19 is formed on the insulation layer 15 and on the electrode 17. The light beams reflected by the wafer 10 and the insulation layer 15 are displayed on a charge-coupled device image sensor (CCD image sensor) 35 by an imaging lens 33. The CCD image sensor 35, produces electrical charges when a light beam is focused thereon, to create image signals. The output signal of the CCD image sensor 35 is fed to a control unit 40 which feeds the image signals to the monitor TV 50, so that a pattern image 100 is displayed on the screen 51 of the TV 50 in accordance with the fine pattern formed on the wafer 10. Then, the pattern 100 displayed on the monitor screen 51 is measured by the measuring method according to the present invention.

Figure 3:
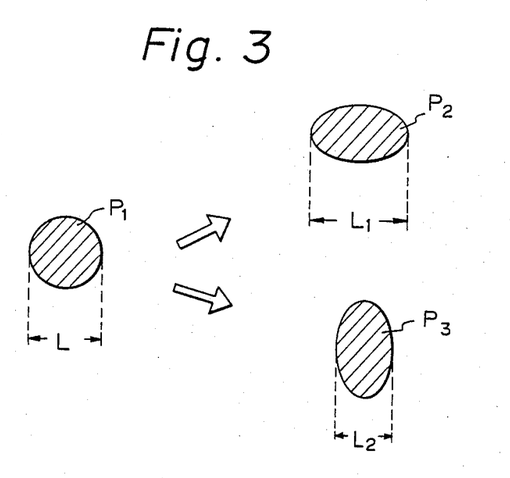
FIG. 3 is a schematic view of a circular pattern and elliptical patterns for explaining the deformation of the circular pattern.

As mentioned before, the circular pattern P1 formed on the wafer 10 is displayed as an elliptical image pattern P2 or P3 on the monitor screen, as shown in FIG. 3. Consequently, the actually measured dimensions (diameters) L1 and L2 are different from the real diameter L of the circular pattern P1. Accordingly, it can not be determined whether the dimensions of the fine pattern P1 formed on the wafer 10 are identical to a design value.

The inventors of the present invention have experimentally found that, when pattern dimensions which are calculated from the surface area of the pattern displayed on the monitor screen are substantially identical to mathematical mean values of pattern dimensions which are measured along lines passing through the center of gravity of the pattern, the pattern image displayed on the monitor screen substantially correctly represents the actual pattern formed on the wafer.

Figure 7:
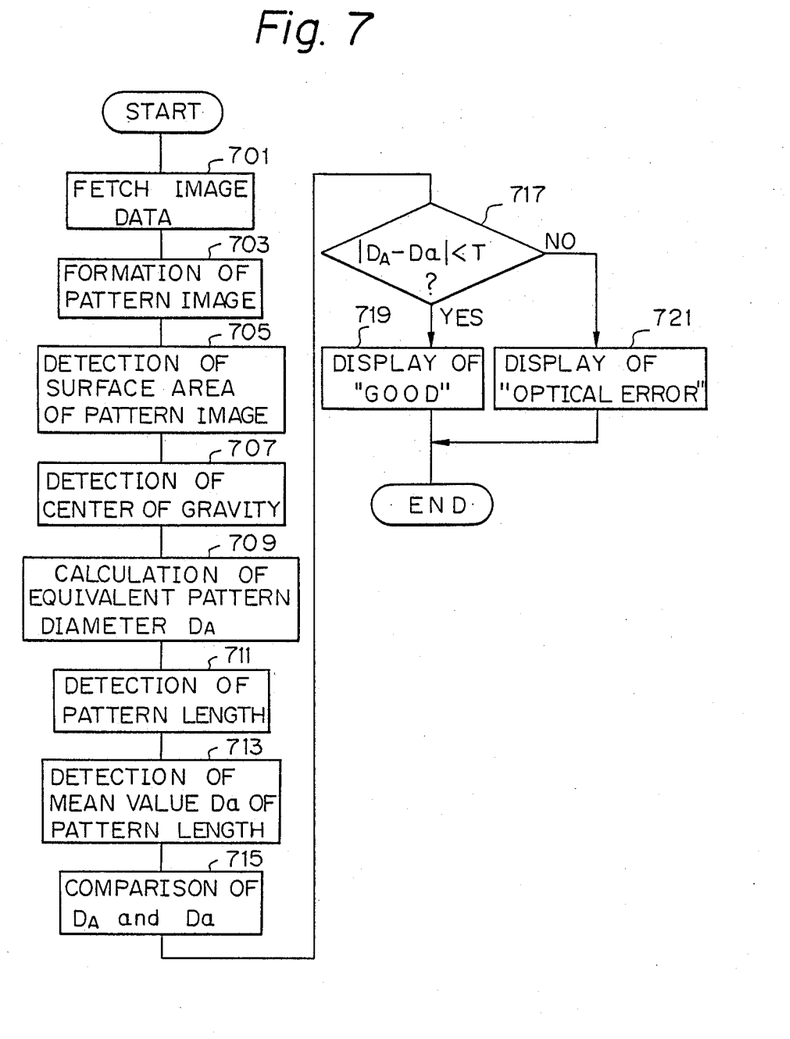
FIG. 7 is a flow chart of measuring steps according to the present invention; and, FIG. 8, comprising

FIG. 7 shows a flow chart of the process carried out in the control unit 40 (FIG. 1), according to the present invention. In step 701, the image data from the CCD image sensor 35 are input into the control unit (computer) 40, and then at step 703, a surface area A of the pattern image is displayed on the monitor screen 51, and is detected by the CCD image sensor 35 at step 705.

The CCD image sensor 35 has a large number of photoelectric devices 35a (FIG. 5) which are in a matrix arrangement and which are given predetermined addresses (i,j) in an X-Y coordinate.

The surface area of the pattern image displayed on the monitor screen can be obtained by counting the number of photoelectric devices (picture elements) 35a activated when the light beam impinges thereon. The picture elements 35a are designed so that when, for example, the light beam impinges on more than half the surface area of each picture element 35a, that element 35a issues image signals (image data). The accuracy of the detection of the surface area of the pattern image displayed on the monitor screen can be easily increased by increasing the density of the matrix arrangement of the picture elements 35a. The outline (profile) of the pattern image displayed on the monitor screen can be also determined by the picture elements 35a, which are activated when the light beam impinges on more than half the surface area thereof.

Figure 5:
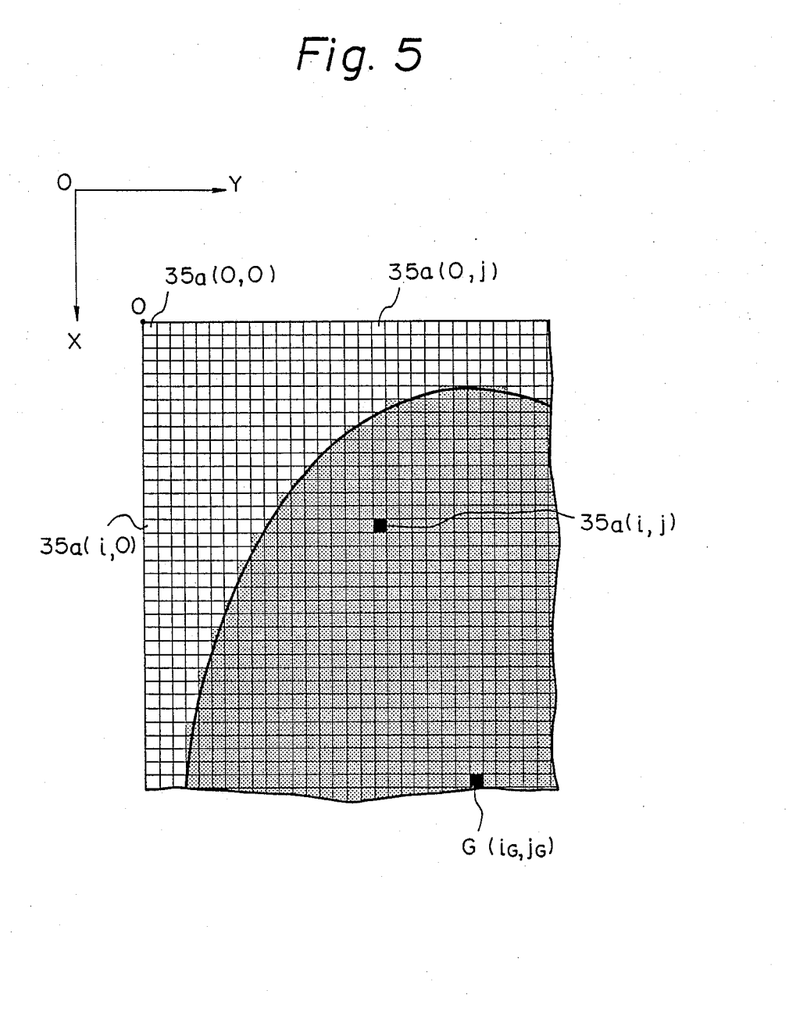
FIG. 5 is an enlarged view of a part of an elliptical pattern image on picture elements of a CCD image sensor used in the present invention.
Figure 6:
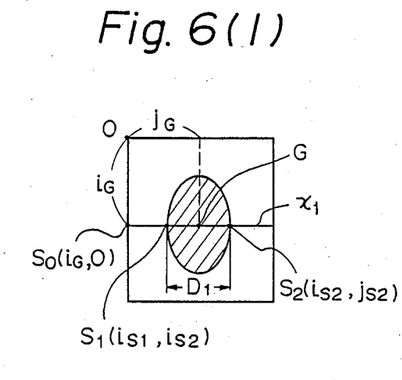

At step 707, the center of gravity G ($i_G$, $j_G$) of the pattern image is detected. The center of gravity G can be easily mathematically obtained by the following equations:

$$i_G = \frac{1}{n} \sum_{i,j=0}^{n-1} i \cdot a_{i,j} \tag{1}$$

$$j_G = \frac{1}{n} \sum_{i,j=0}^{n-1} j \cdot a_{i,j} \tag{2}$$

wherein $a_{i,j}$ are image data which is "1" when the picture elements 35a are activated, i.e., when the light beam impinges on more than half the surface area of the picture elements 35a, and which is "0" when the picture elements 35a are not activated, i.e. when the light beam does not impinge at all on the picture elements 35a or the light beam impinges on less than half the surface area thereof, and wherein n=the number of picture elements 35a along the X-axis (ordinate) and the Y-axis (abscissa) in the coordinate (FIG. 5). In the illustrated embodiment, the number of picture elements 35a is identical in the ordinate and in the abscissa. For example, $n=2^{10}=1024$. Alternatively, a difference in the number of the picture elements 35a between in the ordinate and in the abscissa can be made.

The origin 0 of the coordinate is represented by (0, 0) in FIG. 5.

Subsequently, at step 709, an equivalent diameter $D_A$ of the generally elliptical pattern image P1 or P2 displayed on the screen is calculated. The equivalent diameter $D_A$ is a diameter of an equivalent circle having the same surface area A as the pattern image measured at step 705. The equivalent diameter $D_A$ can be easily obtained from the following equation:

$$D_A = 2\sqrt{A/\pi} \tag{3}$$

wherein, A is a surface area of the pattern image measured at step 705.

Figure 4:
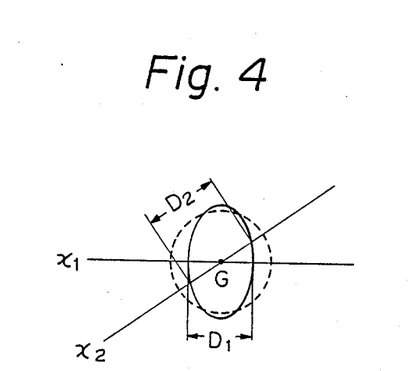
FIG. 4 is a schematic view of a fine pattern for explaining the measurement of dimensions of pattern lengths according to the present invention.

Then, at step 711, actual lengths $D_1$, $D_2$, ... $D_n$ of lines $x_1$, $x_2$, ... $x_n$ (FIG. 4) which pass the center of gravity G and extend between two extremities at which the lines intersect the profile of the pattern image, are measured.

Figures 8, 8A:
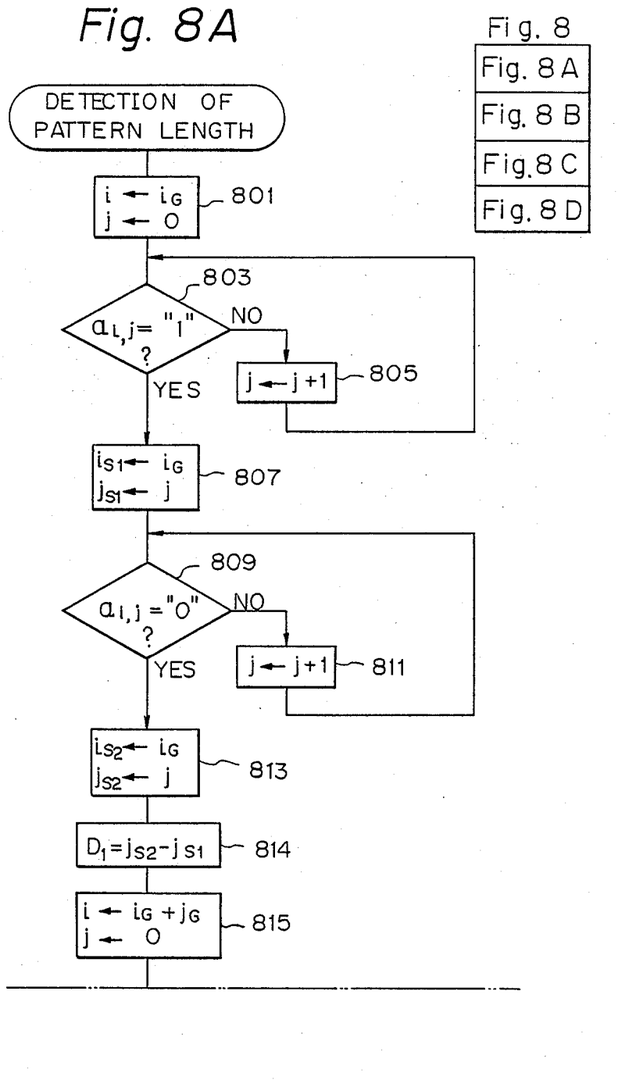
Figure 8:
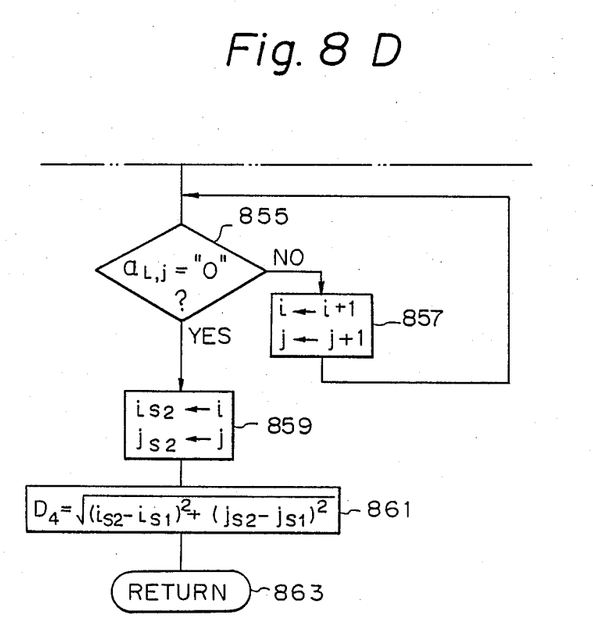
Figure 8B:
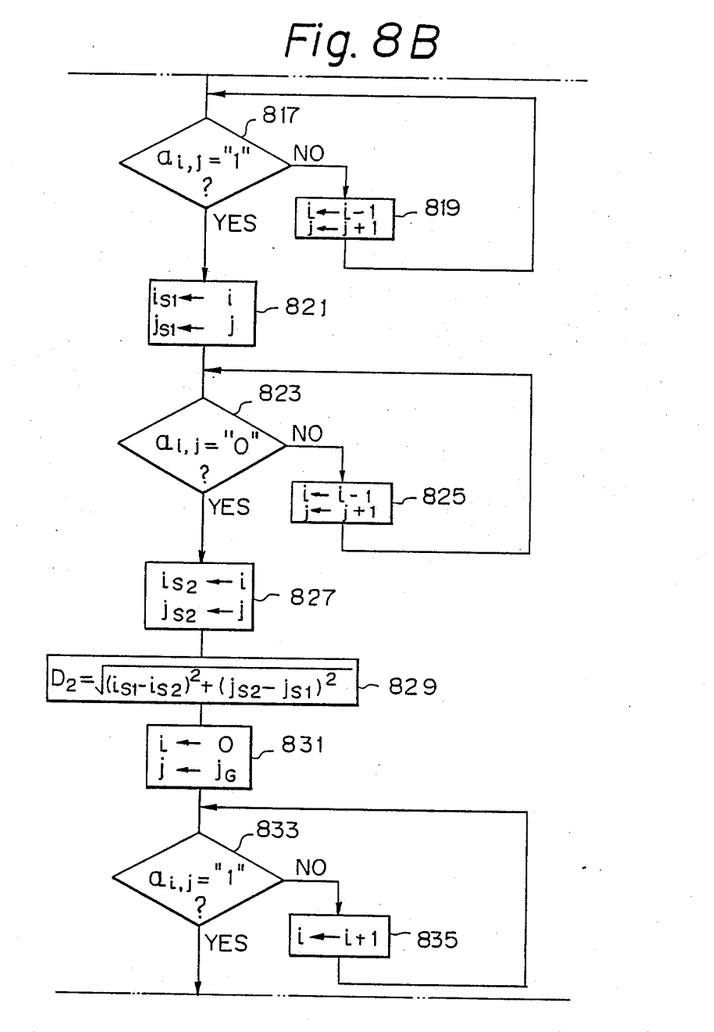
Figure 8C:
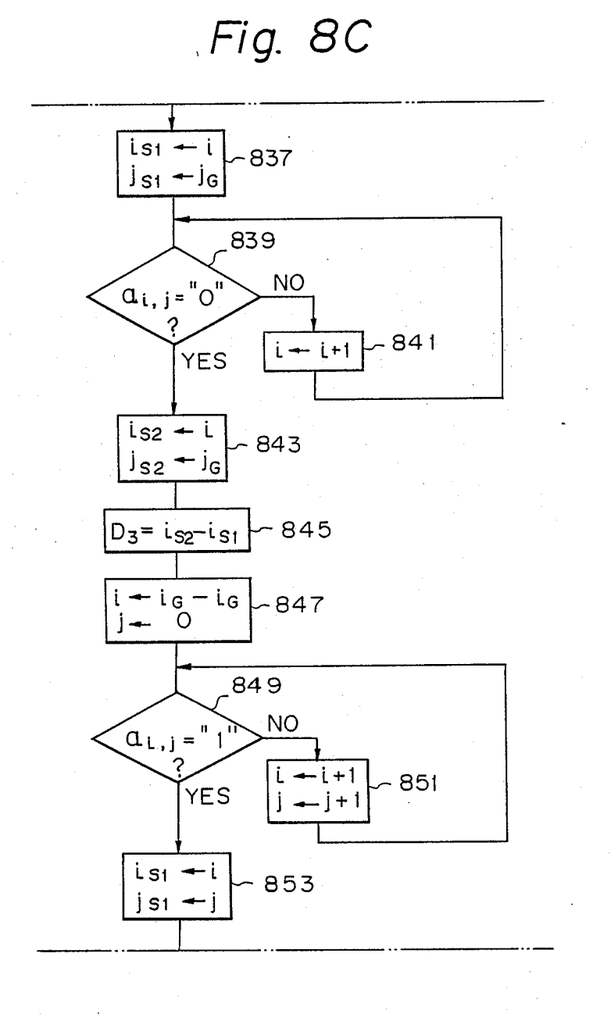

Details of step 711 for the detection of the pattern length are shown in FIG. 8.

In FIG. 8, the detection of only four pattern lengths $D_1$, $D_2$, $D_3$, and $D_4$ of four lines $x_1$, $x_2$, $x_3$ and $x_4$, which are spaced at an equiangular distance of 45°, is shown for clarification. The four lines passing the center of gravity G are shown in FIG. 6, in which the line $x_1$ has a line parallel to the Y-axis (abscissa), and accordingly, has the coordinate represented by ($i_G$, j). Namely, i is a constant (i=$i_G$). The line $x_1$ is successively shifted by 45° in the counterclockwise direction to assume the positions $x_2$, $x_3$, and $x_4$, respectively.

In FIG. 8, first, at step 801, the line $x_1$ is determined. The line $x_1$ intersects the X-axis at a point $S_0$, which is represented by ($i_G$, 0). At step 803, if $a_{i,j}$ is "0" the control proceeds to step 805, which counts the abscissa up by 1 and returns the flow to step 803. At step 803, if $a_{i,j}$ is "1", the control proceeds to step 807, which causes values ($i_{S1}$, $j_{S1}$) of a first intersecting point $S_1$ in which the line $x_1$ first intersects the profile of the pattern image to be $i_G$ and j, respectively. The data $a_{i,j}$ becomes "1" only when the line extends within the profile of the pattern image.

Then, at step 809, if the data $a_{i,j}$ is "1", the control proceeds to step 811, which counts the abscissa up by 1. If $a_{i,j}$ is "0" at step 809, values ($i_{S2}$, $j_{S2}$) of a second intersecting point $S_2$, at which the line $x_1$ again intersects the profile of the pattern image, are caused to be $i_G$ and j, respectively at step 813. The data $a_{i,j}$ becomes "0" when the line $x_1$ intersects the profile of the pattern image at the second intersecting point $S_2$. Thus, the pattern length $D_1$ of the line $x_1$ is obtained from the distance between the points P1 and P2. Namely at step 814, $$D_1 = j_{S2} - j_{S1}.$$

Then, at step 815, the line $x_2$ is determined, which is angularly spaced from the line $x_1$ by 45°. The line $x_2$ intersects the X-axis at a point $S_0$ which is represented by $(i_G + j_G, 0)$, since the ordinate of the point $S_0$ is $(i_G + j_G)$ Subsequently, if $a_{i,j}$ is "0" at the step 817, the control proceeds to step 819 which counts both the ordinate and the abscissa down and up by 1, respectively and returns the flow to step 815. At step 815, if $a_{i,j}$ is "1", the control proceeds to step 821, which causes values $(i_{S1}, j_{S1})$ of a first intersecting point $S_1$ in which the line $x_2$ first intersects the profile of the pattern image to be i and j, respectively.

Then, at step 823, if the data $a_{i,j}$ is "1", the control proceeds to step 825, which counts the ordinate and the abscissa down and up by 1, respectively. If $a_{i,j}$ is "0" at step 823, values $(i_{S2}, j_{S2})$ of a second intersecting point $S_2$, at which the line $x_2$ again intersects the profile of the pattern image, are caused to be i and j, respectively at the step 827. Thus, the pattern length $D_2$ of the line $x_2$ is obtained form the distance between the points P1 and P2, i.e. from $D_2 = \sqrt{(i_{S1} - i_{S2})^2 + (j_{S2} - j_{S1})^2}$, at step 829.

Similarly, at step 831, the third line $x_3$ is determined, which is angularly spaced from the second line $x_2$ by 45°.

The line $x_3$ intersects the Y-axis (abscissa) at the point $S_0$, which is represented by $(0, j_G)$. If $a_{i,j}$ is "0" at step 833, the control proceeds to step 835 which counts the ordinate up by 1 and returns the flow to step 833. At step 833, if $a_{i,j}$ is "1", the control proceeds to step 837, which causes values $(i_{S1}, j_{S1})$ of a first intersecting point $S_1$ in which the line $x_3$ first intersents the profile of the pattern image to be i and $j_G$, respectively.

Then, at step 839, if the data $a_{i,j}$ is "1", the control proceeds to step 841 which counts the ordinate up by 1. If $a_{i,j}$ is "0" at step 839, values $(i_{S2}, j_{S2})$ of a second intersecting point $S_2$, at which the line $x_3$ again intersects the profile of the pattern image, are caused to be i and $j_G$, respectively at step 843. The data $a_{i,j}$ becomes "0" when the line $x_3$ intersects the profile of the pattern image at the second intersecting point $S_2$. Thus, the pattern length $D_3$ of the line $x_3$ is obtained from the distance between the points P1 and P2, i.e., from $D_3 = i_{S2} - i_{S1}$, at step 845. Finally, at step 847, the fourth line $x_4$ is determined which is angularly spaced from the third line $x_3$ by 45°. The line $x_4$ intersects the X-axis (ordinate) at the starting point $S_0$, which is represented by $(i_G - j_G, 0)$, subsequently, if $a_{i,j}$ is "0" at step 849, the control proceeds to step 851 which counts the ordinate and th abscissa up by 1 and returns the flow to step 849. At step 849, if $a_{i,j}$ is "1", the control proceeds to step 853, which causes values $(i_{S1}, j_{S1})$ of a first intersecting point $S_1$ in which the line $x_4$ first intersects the profile of the pattern image to be i and j, respectively.

Then, at step 855, if the data $a_{i,j}$ is "1", the control proceeds to step 857, which counts th ordinate and the abscissa up by 1. If $a_{i,j}$ is "0" at step 855, values $(i_{S2}, j_{S2})$ of a second intersecting points $S_2$, at which the line $x_4$ again intersects the profile of the pattern image, are caused to be i and j, respectively at step 859. The data $a_{i,j}$ becomes "0" when the line $x_4$ intersects the profile of the pattern image at the second intersecting point $S_2$. Thus, the pattern length $D_4$ of the line $x_4$ obtained from the distance between the points P1 and P2, i.e., from $D_4 = \sqrt{(i_{S2} - i_{S1})^2 + (j_{S2} - j_{S1})^2}$, at step 861.

It will be easily understood that pattern lengths of any lines which pass the center of gravity G of the pattern image can be detected in the same way as described above.

The detection of the pattern length at step 711 is completed at step 863.

Then, at step 713, a mean value $D_a$ of the pattern lengths $D_1, D_2, D_3, \ldots D_n$ is detected. The mean value can be obtained from the following equation:

$$D_a = \frac{1}{n} \sum_{n=1}^{n} D_n \tag{4}$$

Subsequently, at step 715, the mean value $D_a$ thus obtained is compared with the equivalent diameter $D_A$ obtained at step 709. If a difference between $D_a$ and $D_A$ is below a predetermined limit value T at step 717, the control proceeds to step 719 which outputs a display "good", which means that the pattern image on the wafer is correctly displayed on the monitor screen by the optical image forming system.

On the contrary, if the difference between $D_a$ and $D_A$ is above the predetermined limit value T, the term "optical error" is displayed at step 721.

When "optical error" is displayed at step 721, the operator must adjust the optical system. The adjustment of the optical system includes, for example, an adjustment of the optical axis of the light source, an adjustment of lens angles of the lenses 31 and 33 with respect to the light beams incident thereupon, or an adjustment of lens centers of the lenses 31 and 33. The lenses 31 and 33 are supported at one ends by springs 43 and 45 for universal movement. The opposite ends of the lenses 31 and 33 are provided with adjusting screws 32, 34 and 36, 38. The adjusting screws 32 and 36 adjust the lens angles of the lenses 31 and 33 with respect to the light beams incident thereupon. The adjusting screws 34 and 38 adjust the lens centers of the lenses 31 and 33 in the lens axis directions. The lenses 31 and 33 can be provided with additional adjusting screws (not shown) which adjust the lens position in the direction perpendicular to the directions of adjustment by the adjusting screws 32, 34 and 36, 38, respectively. The operator can manually adjust the adjusting screws in accordance with the display at steps 719 and 721.

After the adjustment is carried out, the process shown in FIG. 7 is repeated until "good" is finally displayed at step 719.

Alternatively, it is also possible to automatically adjust the optical system by means of suitable actuators in accordance with the "optical error" display.

At step 719, if "good" is displayed, either the equivalent diameter $D_A$ or the mean value $D_a$ can be used as an actual diameter of the substantially circular pattern formed on the wafer.

As can be seen from the above discussion, according to the present invention, the dimensions of fine patterns can be easily and precisely measured.

Furthermore, according to the present invention, the optical system reproduces the pattern on the display unit, such as monitor TV, with an increased precision.

The present invention is not limited to the embodiments described above and illustrated in the drawings and can be applied to measure dimensions of any fine pattern, for example, that of a mask which forms the contact holes or through holes on the wafer mentioned above.

We claim:

1. A method for measuring dimensions of a fine pattern, comprising:

calculating a surface area and determining a profile of a displayed pattern image;

calculating a center of gravity in the pattern image;

calculating an equivalent diameter of a circular pattern having the same surface area as the pattern image;

calculating a mathematical mean value of pattern lengths of lines which all pass through the center of gravity of the pattern image and which intersect the pattern image at two points of the profile, said pattern lengths being defined as distances between the two points; and comparing the means value with the equivalent diameter of the circular pattern image.

2. A method according to claim 1, wherein said pattern image is displayed on a display unit by means of an optical image forming system.

3. A method according to claim 2, further comprising adjusting the optical image forming system in accordance with the result of said comparison of the mean value and the equivalent diameter.

4. A method according to claim 3, wherein said optical image forming system comprises an optical image sensor having a large number of photoelectric picture elements and wherein the step of calculating the surface area of the pattern image comprises counting the number of picture elements.

* * * * *